United States Patent
Spix

(10) Patent No.: US 8,695,339 B2
(45) Date of Patent: Apr. 15, 2014

(54) BLOWBY FLOW CONTROL SYSTEM FOR A TURBOCHARGED ENGINE

(75) Inventor: Thomas A. Spix, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 108 days.

(21) Appl. No.: 13/107,335

(22) Filed: May 13, 2011

(65) Prior Publication Data

US 2012/0285425 A1 Nov. 15, 2012

(51) Int. Cl.
*F02B 33/44* (2006.01)
*F02B 25/06* (2006.01)

(52) U.S. Cl.
USPC ............................ 60/605.1; 123/572; 123/574

(58) Field of Classification Search
USPC .................................. 123/572–574; 60/605.1
See application file for complete search history.

(56) References Cited

U.S. PATENT DOCUMENTS

| | | | |
|---|---|---|---|
| 5,140,968 A * | 8/1992 | Doan ............................ | 123/572 |
| 7,431,023 B2 | 10/2008 | Kavanagh et al. | |
| 7,523,748 B2 * | 4/2009 | Hirano et al. ................. | 123/572 |
| 8,439,022 B2 | 5/2013 | Ruppel et al. | |
| 2001/0047801 A1 * | 12/2001 | Baeuerle et al. .............. | 123/574 |
| 2009/0320808 A1 * | 12/2009 | Albert et al. ................... | 123/556 |
| 2010/0000499 A1 * | 1/2010 | Braun et al. ............... | 123/559.1 |

FOREIGN PATENT DOCUMENTS

CN 101432505 A 5/2009
WO WO 2009084144 A1 * 7/2009

OTHER PUBLICATIONS

Chinese Office Action for Application No. 201210202384.6 dated Jan. 16, 2014; 10 pages.

* cited by examiner

*Primary Examiner* — Thai Ba Trieu
*Assistant Examiner* — Ngoc T Nguyen
(74) *Attorney, Agent, or Firm* — Cantor Colburn LLP

(57) ABSTRACT

A flow control system is provided having an engine, a turbocharger, and positive crankcase ventilation (PCV) line, and a flow regulating device. The engine has an air-oil separator and an intake manifold. The air-oil separator separates oil droplets and oil mist from a blowby gas. The turbocharger has an air inlet and an air outlet, where the air outlet is connected to the intake manifold of the engine. The positive crankcase ventilation (PCV) vent line has a first end connected to the air-oil separator and a second end connected to the air inlet of the turbocharger. The PCV vent line delivers the blowby gas from the air-oil separator to the air inlet of the turbocharger. The flow regulating device is located in the PCV vent line. The flow regulating device selectively limits the flow of blowby gas from the air-oil separator to the air inlet of the turbocharger.

20 Claims, 1 Drawing Sheet

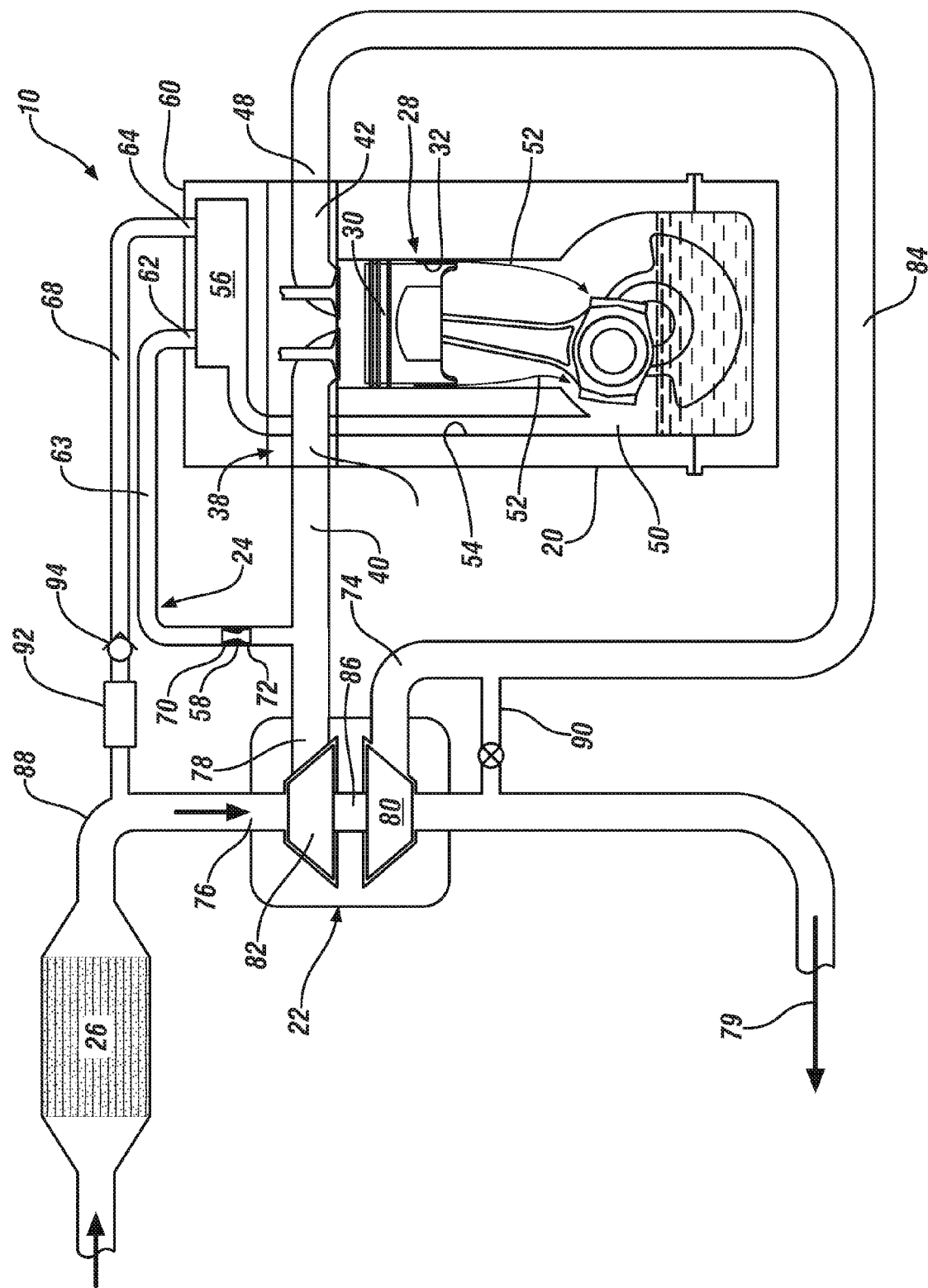

BLOWBY FLOW CONTROL SYSTEM FOR A TURBOCHARGED ENGINE

FIELD OF THE INVENTION

The subject invention relates to flow control systems, and in particular to a flow control system for a turbocharged engine having a flow regulating device located in a PCV vent line that attaches to the turbocharger.

BACKGROUND

During engine operation, combustion gas may leak between the cylinder and the corresponding piston rings, and into the engine crankcase. The leaked combustion gas is referred to as blowby gas, and typically includes unburned intake air, fuel, exhaust gas, oil mist, and water vapor. In an effort to ventilate the crankcase and re-circulate the blowby gas to the intake side of the engine, a positive crankcase ventilation (PCV) system is provided.

An air-oil separator is provided for separating the blowby gases from oil and mist. In a turbocharged engine, a portion of the blowby gas passes through the air-oil separator is then routed to the inlet of the turbocharger through a PCV line. The turbocharger is connected to an intake manifold of the engine. During high boost conditions, a partial vacuum may be created at the turbocharger inlet and inside the crankcase of the engine. The partial vacuum is created when airflow into the turbocharger increases, under high boost conditions. This in turn may cause the negative pressure limit of the crankcase to be exceeded. The crankcase includes lip seals that are typically mounted between the engine block and the crankshaft, and are used for sealing and to prevent the ingress of contaminants and oil leakage. However, exceeding the negative pressure limit of the crankcase may cause the lip seals to be pulled out of their seated positions.

In one approach, the level of crankcase vacuum is limited by reducing a portion of the PCV vent line diameter. In an alternative approach, an orifice with a specified size is provided in the PCV vent line. However, selecting an appropriate PCV line diameter or orifice can often take a significant amount of time, testing and development to obtain the desired crankcase pressures under high boost conditions. Moreover, even when the appropriate PCV line diameter or orifice is selected, PCV icing or crankcase $NO_x$ requirements may not be met. Specifically, in cold climates condensed water in the PCV system can gather and freeze, especially in areas where the PCV line diameter has been reduced. Frozen water in the PCV line can lead to an obstructed gas flow, or to icing of the vent system components. $NO_x$ requirements are adversely affected because a restricted gas flow in the PCV line will in turn lead to less fresh air being supplied to the engine crankcase.

In yet another approach to limit the level of crankcase vacuum, the PCV line length is significantly extended. However, this approach will also have the tendency to gather condensed water in the PCV line and freeze. Accordingly, it is desirable to provide a PCV system that will not exceed a specified crankcase vacuum at high boost conditions while still meeting PCV icing and crankcase $NO_x$ requirements.

SUMMARY OF THE INVENTION

In one exemplary embodiment of the invention a flow control system is provided having an engine, a turbocharger, and positive crankcase ventilation (PCV) line, and a flow regulating device. The engine has an air-oil separator and an intake manifold. The air-oil separator separates oil from the blowby gas. The turbocharger has an air inlet and an air outlet, where the air outlet is connected to the intake manifold of the engine. The positive crankcase ventilation (PCV) vent line has a first end connected to the air-oil separator and a second end connected to the air inlet of the turbocharger. The PCV vent line delivers the blowby gas from the air-oil separator to the air inlet of the turbocharger. The flow regulating device is located in the PCV vent line. The flow regulating device selectively limits the flow of blowby gas from the air-oil separator to the air inlet of the turbocharger.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawing in which an exemplary schematic diagram of a flow control system for a turbocharged engine is illustrated.

DESCRIPTION OF THE EMBODIMENTS

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, the drawing is a schematic diagram of a flow control system indicated by reference number 10. The flow control system 10 includes an engine 20, a turbocharger 22, a positive crankcase ventilation (PCV) system 24, and an air filter 26. The engine 20 includes at least one piston-cylinder assembly 28 including a reciprocating piston 30 and cylinder 32. An intake port 36 is provided in a cylinder head 38 of the engine 20 for each piston 30, and is used to deliver an air/fuel mixture from an intake manifold 40. An exhaust port 42 is provided for each piston-cylinder assembly 28 and is connected to an exhaust manifold 48. The exhaust manifold 48 is in fluid communication with and is configured to remove exhaust gases from the engine 20. During engine operation, the intake stroke of the piston 30 draws intake air through the intake manifold 40 and the intake port 36. During the power stroke of the piston 30, a portion of the combustion gas blows by the piston 30 and into a crankcase 50 of the engine 20, and is referred to as a blowby gas 52. The PCV system 24 is provided for re-circulating the blowby gas 52 back into the engine 20, via the intake manifold 40.

The PCV system 24 includes an air-oil separator 56 and a nozzle 58, which may be any type of flow control device. The air-oil separator 56 may be located in a head cover 60 of the engine 20, and draws the blowby gases 52 from each piston-cylinder assembly 28 though a corresponding breather tube 54. The air-oil separator 56 is employed to separate oil droplets and oil mist from the blowby gas 52. The air-oil separator 56 further includes two outlets 62 and 64 for emitting the blowby gas 52, where a first outlet 62 is fluidly connected to the nozzle 58 located in a vent line 63, and the second outlet 64 is fluidly connected to a PCV vent line 68. The air-oil separator 56 may include a labyrinthine structure with multiple chambers for draining oil (not shown), however it is understood that the air-oil separator 56 may include other configurations as well.

In the exemplary embodiment as shown, the nozzle 58 is a venturi type nozzle having an inlet 70 and an outlet 72, however it is understood that other types of nozzles or valves may be used as well to provide generally constant flow under various engine operating conditions. The inlet 70 is fluidly connected to the first outlet 62 of the air-oil separator 56. The outlet 72 is fluidly connected to the intake manifold 40 and emits a portion of the blowby gas 52 as the blowby gas 52 passes through the air-oil separator 56. An example of the nozzle 58 is described in commonly owned U.S. Pat. No. 7,431,023 and is herein incorporated by reference in its entirety.

The turbocharger 22 includes an exhaust inlet 74, an ambient air inlet 76, a discharge air outlet 78, an exhaust outlet 79, a turbine 80 and a compressor 82. An exhaust conduit 84 connects the exhaust manifold 48 of the engine 20 to the exhaust inlet 74 of the turbocharger 22, where exhaust gas discharged from the exhaust manifold 48 enters the turbocharger 22. Exhaust gas is used to drive a turbine wheel (not shown) located within the turbine 80 of the turbocharger 22, which in turn drives a shaft 86 that drives a wheel (not shown) of the compressor 82. The exhaust gas exits the turbocharger 22 though the exhaust outlet 79, where the exhaust gas exits the flow control system 10 though an exhaust system (not shown). Ambient air enters the compressor 82 of the turbocharger 22 through an air intake duct 88. In the embodiment as shown, the air filter 26 is located before the air intake duct 88. The compressor 82 compresses or turbocharges the ambient air, and then outputs the compressed ambient air through the discharge air outlet 78 and to the intake manifold 40. In one embodiment, a wastegate valve 90 is provided with the exhaust conduit 84 and is used to selectively bypass some or all of the exhaust gas from the turbine 80 of the turbocharger 22.

The PCV vent line 68 fluidly connects the air-oil separator 56 to the air intake duct 88 of the turbocharger 22. The PCV vent line 68 feeds a portion of the blowby gases 52 collected in the air-oil separator 56 into the air intake duct 88 upstream of the turbocharger. When the engine 20 is operated in a boosted condition, these blowby gases 52 from the PCV vent line 68 are drawn though the compressor 82 and are introduced back into the engine 20 though the intake manifold 40 for re-combustion. Conversely when the engine 20 is operated in a non-boosted condition the blowby gas 52 is not introduced into the PCV vent line 68 but is instead introduced into the intake manifold 40 through the vent line 63 by a conventional blowby flow regulator, such as the nozzle 58, which is used on current engine systems. Current engine systems available today have a conventional flow regulator, such as a PCV valve, nozzle, orifice, or crankcase pressure regulator.

A flow regulating device 92 is located within the PCV vent line 68. The flow regulating device 92 is employed to selectively limit the flow of the blowby gas 52 from the air-oil separator 56 into the ambient air inlet 76 of the turbocharger 22. In one exemplary embodiment, the flow control device 92 could be a venturi nozzle having a convergent inlet and a divergent outlet. However, it is understood that other types of flow regulating devices may be employed in the PCV vent line 68 to limit or control the flow of blowby gas 52 therethrough. For example, the flow control device 92 could be an electronically controlled or a mechanical valve. In the embodiment as shown, a check valve 94 is also provided upstream of the flow control device 92 in the PCV vent line 68. The check valve 94 is provided for substantially preventing the occurrence of reverse flow in the PCV vent line 68. That is, the check valve 94 substantially prevents or reduces the occurrence of ambient air from the air intake duct 88 flowing into the air-oil separator 56 though the PCV vent line 68. It should be noted that although a PCV system is illustrated in FIG. 1, it is understood that the flow regulating device 92 may be employed in other types of vent systems as well. For example, in another embodiment, the flow regulating device 92 could be used in a closed crankcase vent (CCV) system.

If there is a high amount of airflow into the ambient air inlet 76 of the compressor 82, a vacuum is created at the ambient air inlet 76 and inside the crankcase 50. A high amount of airflow at the ambient air inlet 76 typically occurs during high boost conditions. Creating a partial vacuum inside the crankcase 50 of the engine 20 is generally undesirable, as a partial vacuum can cause the negative pressure limit of the crankcase 50 to be exceeded. In one embodiment, the negative pressure limit of the crankcase 50 is about −4 kPa, however it is understood that this value may vary depending on the configuration of the engine sealing systems. This is especially problematic because exceeding the negative pressure limit of the crankcase 50 may cause the crankshaft seals (not shown) located within the crankcase 50 to be pulled out of a seated position, or distorted in a manner so as to reduce function. Thus, the flow regulating device 92 is employed to limit the amount of blowby gas 52 entering the air intake duct 88 under high vacuum conditions upstream of the ambient air inlet 76 of the compressor 82. Limiting the amount of blowby flow gas 52 into the ambient air inlet 76 of the compressor 82 will in turn reduce or substantially eliminate instances where the compressor 82 creates a partial vacuum inside the crankcase 50 and the negative pressure limit is exceeded.

Several other approaches are currently available to limit the amount of airflow into the air intake duct 88 of the compressor 82. However, each of these approaches have significant drawbacks. For example, in one approach a portion of the PCV vent line diameter is restricted at the air-oil separator. In an alternative approach, an orifice with a specified size is provided in the PCV vent line. However, selecting an appropriate PCV line diameter or orifice can sometimes take weeks of testing and development. Even when the appropriate PCV line diameter or orifice is selected, PCV icing or crankcase $NO_x$ level requirements may not always be met. Another approach is to significantly extend the length of the PCV vent line. However, this approach will also have the tendency to gather condensed water and freeze. Providing the flow regulating device 92 located within the PCV vent line 68 will reduce or prevent the negative crankcase pressure to be exceeded at high boost conditions, while at the same time meeting PCV icing and crankcase $NO_x$ level requirements. The flow regulating device 92 may also be less expensive when compared to some other approaches currently available, as development and testing time is significantly reduced when employing the flow regulating device 92.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A flow control system, comprising:
    an engine having an air-oil separator and an intake manifold, wherein the air-oil separator is disposed for receiving a flow of blowby gas from a crankcase of the engine and is configured for separating oil droplets and oil mist from a the flow of blowby gas;
    a turbocharger having an air inlet and an air outlet, wherein the air outlet is fluidly connected to the intake manifold of the engine;
    a positive crankcase ventilation (PCV) vent line having a first end fluidly connected to the air-oil separator and a second end fluidly connected to the air inlet of the turbocharger, wherein the PCV vent line delivers the flow of blowby gas from the air-oil separator to the air inlet of the turbocharger; and
    a flow regulating device located in the PCV vent line, wherein the flow regulating device is configured to selectively limit the flow of blowby gas from the air-oil separator to the air inlet of the turbocharger such that a predefined limit for negative pressure within the crankcase is not exceeded when the engine is operated in a boosted condition.

2. The flow control system of claim 1, wherein the flow regulating device is configured to selectively control the amount of the flow of blowby gas based on the extent of the vacuum that is created in the crankcase of the engine such that a predefined limit for negative pressure within the crankcase is not exceeded while the engine is operated in a boosted condition.

3. The flow control system of claim 1, wherein the negative pressure limit of the crankcase is about −4 kPa.

4. The flow control system of claim 1, wherein a check valve is included in the PCV vent line upstream of the flow regulating device, and wherein the check valve substantially prevents air from the air inlet of the turbocharger from flowing into the air-oil separator.

5. The flow control system of claim 1, wherein the flow regulating device is one of a venturi nozzle, an electronically controlled valve, and a mechanical valve, and wherein the flow regulating device is configured so that a predefined negative pressure limit of the crankcase is not exceeded while the engine is operated in a boosted condition.

6. The flow control system of claim 5, wherein the flow regulating device is a venturi nozzle that is configured so that a predefined negative pressure limit of the crankcase is not exceeded while the engine is operated in a boosted condition.

7. The flow control system of claim 5, wherein the flow regulating device is an electronically controlled valve that is controlled so that a predefined negative pressure limit of the crankcase is not exceeded while the engine is operated in a boosted condition.

8. The flow control system of claim 5, wherein the flow regulating device is a mechanical valve that is controlled so that a predefined negative pressure limit of the crankcase is not exceeded while the engine is operated in a boosted condition.

9. The flow control system of claim 1, wherein the turbocharger includes an exhaust outlet that is fluidly connected to an exhaust system.

10. A flow control system, comprising:
    an engine having an air-oil separator and an intake manifold, wherein the air-oil separator is disposed for receiving a flow of blowby gas from a crankcase of the engine and is configured for separating oil droplets and oil mist from the flow of blowby gas;
    a turbocharger having an air inlet and an air outlet, wherein the air outlet is fluidly connected to the intake manifold of the engine;
    a positive crankcase ventilation (PCV) vent line having a first end connected to the air-oil separator and a second end connected to the air inlet of the turbocharger, wherein the PCV vent line delivers the flow of blowby gas from the air-oil separator to the air inlet of the turbocharger;
    a flow regulating device located in the PCV vent line, wherein the flow regulating device is configured to selectively limit the flow of blowby gas from the air-oil separator to the air inlet of the turbocharger such that a predefined limit for negative pressure within the crankcase is not exceeded when the engine is operated in a boosted condition; and
    a check valve located in the PCV vent line upstream of the flow regulating device, wherein the check valve substantially prevents air from the air inlet of the turbocharger from flowing into the air-oil separator.

11. The flow control system of claim 10, wherein the flow regulating device limits the amount of the flow of blowby gas when a partial vacuum is created at the air inlet of the turbocharger and in a crankcase of the engine, and wherein the flow regulating device is configured for substantially eliminating instances where a predefined negative pressure limit of the crankcase is exceeded.

12. The flow control system of claim 10, wherein the flow regulating device is one of a venturi nozzle, an electronically controlled valve, and a mechanical valve.

13. The flow control system of claim 10, wherein a nozzle fluidly connects the air-oil separator to the intake manifold of the engine.

14. The flow control system of claim 10, wherein the turbocharger is fluidly connected to an air filter through the air inlet.

15. The flow control system of claim 10, wherein the turbocharger includes an exhaust inlet, and wherein an exhaust conduit fluidly connects an exhaust manifold of the engine to the exhaust inlet of the turbocharger.

16. The flow control system of claim 10, wherein the turbocharger includes an exhaust outlet that is fluidly connected to an exhaust system.

17. A flow control system, comprising:
    an engine having an air-oil separator, an intake manifold and an exhaust manifold, wherein the air-oil separator is disposed for receiving a flow of blowby gas from a crankcase of the engine and is configured for separating oil droplets and oil mist from the flow of blowby gas;
    a turbocharger having an exhaust inlet, an air inlet and an air outlet, wherein the air outlet is connected to the intake manifold of the engine;
    an exhaust conduit fluidly connecting the exhaust manifold of the engine to the exhaust inlet of the turbocharger;
    a positive crankcase ventilation (PCV) vent line having a first end fluidly connected to the air-oil separator and a second end fluidly connected to the air inlet of the turbocharger, wherein the PCV vent line delivers the flow of blowby gas from the air-oil separator to the air inlet of the turbocharger;
    a flow regulating device located in the PCV vent line, wherein the flow regulating device is configured to selectively limit the flow of blowby gas from the air-oil separator to the air inlet of the turbocharger when a partial vacuum is created at the air inlet of the turbocharger and in a crankcase of the engine such that a predefined limit for negative pressure within the crankcase is not exceeded when the engine is operated in a boosted condition; and a check valve located in the PCV vent line upstream of the flow regulating device, wherein the check valve substantially prevents air flow from the air inlet of the turbocharger from flowing into the air-oil separator.

18. The flow control system of claim 17, wherein the flow regulating device is one of a venturi nozzle, an electronically controlled valve, and a mechanical valve.

19. The flow control system of claim 17, wherein a nozzle fluidly connects the air-oil separator to the intake manifold of the engine.

20. The flow control system of claim 17, wherein the turbocharger is fluidly connected to an air filter through the air inlet.

* * * * *